United States Patent [19]

Mortier et al.

[11] 4,085,571
[45] Apr. 25, 1978

[54] RESILIENT MOUNTING FOR AGRICULTURAL MACHINERY ATTACHMENT

[75] Inventors: Frans H. Mortier, Maldegem; Frans Degraeve, Zedelgem, both of Belgium

[73] Assignee: Sperry Rand Corporation, New Holland, Pa.

[21] Appl. No.: 678,839

[22] Filed: Apr. 21, 1976

[30] Foreign Application Priority Data

May 2, 1975 United Kingdom ............... 18318/75

[51] Int. Cl.² ............................................. A01D 67/00
[52] U.S. Cl. .................................................... 56/208
[58] Field of Search .................... 56/208, 364, 11.9

[56] References Cited

U.S. PATENT DOCUMENTS

| | | | |
|---|---|---|---|
| 2,971,316 | 2/1961 | Popandopulo | 56/208 |
| 3,151,429 | 10/1964 | Dyrdahl | 56/15.9 |
| 3,266,230 | 8/1966 | Rowbotham | 56/208 |
| 3,509,701 | 5/1970 | Clarke | 56/208 |
| 3,736,737 | 6/1973 | Schumacher et al. | 56/208 |
| 3,808,784 | 5/1974 | Gardner et al. | 56/208 |

*Primary Examiner*—Russell R. Kinsey
*Attorney, Agent, or Firm*—John B. Mitchell; Frank A. Seemar; Joseph A. Brown

[57] ABSTRACT

The invention relates to agricultural machinery having resiliently mounted attachments which should follow the ground contour closely when in an operative position. The agricultural machine comprises a base structure; an attachment pivotally mounted by pivot means thereto at one end thereof, and resilient weight compensation means extending upwardly from a fixation means on the base structure on one side of the pivot means to a fixation means on the attachment located above and on the other side of the pivot means for floatingly maintaining the attachment in contact with the ground contour when in an operative position. Independent lifting means are mounted pivotally on the base structure below the pivot means and comprising at least one arm extending beneath the attachment for lifting the latter from the operative position to a transport position.

14 Claims, 7 Drawing Figures

RESILIENT MOUNTING FOR AGRICULTURAL MACHINERY ATTACHMENT

BACKGROUND OF THE INVENTION

1. Field of the Invention

This invention relates to agricultural machinery having resiliently mounted attachments.

The invention is particularly useful when applied to forage harvesters having attachments, such as a pick-up means which, in operation, should closely follow the ground contours. While the invention will be described hereafter in further detail in connection with a pick-up mechanism for a forage harvester, the invention is equally well applied to other agricultural machinery having other attachments such as, for example, a direct-cut attachment for forage harvesters and a header for mower-conditioners. The terms "forward" and "rearward" used throughout the specification are with respect to the direction of movement of the machine in operation.

2. Description of the prior art

Known forage harvesters normally have a wheel-supported framework upon which the cutterhead is mounted. Since crop lying on the ground has to be lifted therefrom and fed to the cutterhead by the pick-up mechanism, it is clear that in operation the pick-up mechanism should closely follow the contours of the ground so as to operate properly. Therefore, in known forage harvesters, the pick-up mechanism is pivotally mounted in front of the cutterhead in a crop transfer relationship. The pivot axis of the pick-up mechanism is provided at the rearward side thereof.

Some known forage harvesters further comprise a pick-up lifting mechanism having a pair of forwardly-extending arms and another upwardly-extending arm. This lifting mechanism is pivotally mounted on the framework at a location substantially below the pick-up pivot axis and is arranged so that the pair of forwardly-extending arms project below the pick-up mechanism to support and lift the latter. The upwardly-extending arm is positioned rearwardly of the pick-up pivot axis. Tension spring means may extend between the upper end of the upwardly-extending arm and a portion of the framework and be arranged to compensate the major part of the weight torque of the pick-up means tending to pivot the pick-up means downwardly. Thus, when in operation the pick-up mechanism just contacts the ground and as ground irregularities are encountered, the pick-up mechanism is more or less caused to float over these.

While in general the above described known arrangement has heretofore been satisfactory, this structure still has some disadvantages which become more significant when the same principles are applied to a selfpropelled harvester.

Indeed, assuming that with the above described known forage harvester the pick-up is momentarily positioned above a dip in the ground, then theoretically the pick-up mechanism should automatically be pivoted downwardly. Thereby the centre of gravity of the pick-up mechanism would move to a position which, when seen in fore-and-aft direction, is closer to the pivot axis of the pick-up mechanism. This means that the weight torque around the pivot axis decreases. Theoretically, the compensation torque should be decreased accordingly. However, as the aforementioned tension spring is stretched by a downward movement of the pick-up mechanism and as the perpendicular distance between the pivot axis of the pick-up lifting mechanism and the spring is also slightly increased, the compensation torque is increased, rather than decreased, by a downward movement of the pick-up mechanism. This will, of course, result in the pick-up mechanism not properly following the contours of the ground surface, i.e. the known compensation mechanism does not operate satisfactorily.

On pull-type forage harvesters, the pick-up mechanism is installed close to the supporting wheels. As a result, provided the ground irregularities are not too sharp, the whole machine can more or less follow the ground contour, whereby the compensating mechanism of the pick-up means should only have angularly to adjust the position of the pick-up means over a relatively small range.

On a self-propelled forage harvester, the pick-up mechanism is installed normally much further in front of the front wheels. This necessitates the pick-up mechanism being angularly adjustable over a much larger range. This is aggravated by the rear wheels of the self-propelled forage harvesters being positioned even further rearwardly. Indeed, when these wheels momentarily enter a dip while the front wheels ride over a bump, the whole machine is pivoted around the front wheel axis, whereby the pick-up mechanism, which is positioned in front of this wheel axis, has to be pivoted in an opposite direction over a still larger angle. It will, therefore, be clear that the disadvantage which is inherent to the known structure, is aggravated when the same structure is embodied on a self-propelled machine.

Furthermore, some known forage harvesters also comprise a hydraulic lifting cylinder which acts directly on the upwardly-extending arm of the lifting mechanism so that, when desired, it can override the compensation mechanism and pivot the pick-up mechanism from the operative position to a raised transport position. However, when the pick-up is in the operative position, this hydraulic cylinder sometimes may adversely affect the operation of the compensation mechanism.

Also, in the known arrangement, a relatively large number of components have to move during the compensation operation. This results in considerable frictional forces between the various components as well as inertia forces which all adversely influence the proper compensation operation.

SUMMARY OF THE INVENTION

It is the principle object of the present invention to overcome or to attenuate one or more of the aforementioned disadvantages of the known compensation mechanism.

According to the present invention, an agricultural machine with a base structure comprises an attachment pivotally mounted by pivot means on the base structure at one end thereof and extending from that end, resilient weight compensation means attached at one end to the attachment at a location above the pivot means and at the other end to the base structure for floatingly maintaining the attachment in contact with the ground contour when in an operative position, and independent lifting means pivotally mounted on the base structure at said one end below the pivot means and comprising at least one arm extending beneath the attachment for lifting the latter from the operative position to a transport position.

The invention is particularly useful on self-propelled forage harvesters but may equally well be applied to pull-type forage harvesters and to tractor-mounted harvesters, as well as on other types of agricultural machines. Self-propelled forage harvesters normally have a front and a rear pair of ground wheels while a pull-type harvester only has one pair of such wheels.

Preferably the resilient weight compensation means are formed by a tension spring which extends upwardly from a fixation means on the base structure on one side of the pivot means to a fixation means on the attachment located above and on the other side of the pivot means. With this particular arrangement, when the tension spring is stretched and pivoted as a result of downward pivotal movement of the attachment, the spring is moved towards the pivot means. Thus the compensation torque or couple of the spring around the pivot axis of the attachment remains substantially unchanged, possibly even decreased slightly, when the attachment is pivoted downwardly. Furthermore, the compensation spring acts directly on the attachment mechanism rather than on intermediate lifting means. This means that only a small number of components have to move during the compensating operation, whereby the friction forces and the inertia of the moving masses are reduced to a minimum.

The lifting means for the attachment may be mounted on the base structure by a transversely-extending shaft and may comprise a pair of arms which extend underneath the attachment, each arm having at its outer end a roller which contacts the underside of the attachment so that when the arms are pivoted upwardly, the attachment is lifted without any substantial friction occurring between the arms and the attachment. The lifting means may further comprise a further arm attached at one end to the shaft and at the other end to an hydraulic cylinder mounted on the base structure. Upon actuation of the hydraulic cylinder, the further arm rotates the shaft and hence pivots the lifting arm or arms to raise the attachment to a transport position. The lifting means has no other purpose than to raise the attachment to a transport position and it thus does not assist in weight compensation. First spring means may be provided between the base structure and the further arm to urge the lifting arms upwardly, whereby they follow any upward movement of the attachment during operation of the weight compensation means so as to prevent the ends of the lifting arms digging into the ground. The hydraulic cylinder may be coupled to the lifting means in such a manner so that free pivotal motion of the lifting means to follow the attachment is possible without the plunger being extracted from the cylinder.

Preferably, the hydraulic cylinder is of the single-acting type and second spring means may be provided to urge the piston to the retracted position whenever the cylinder is not actuated. This feature, together with the special coupling between the cylinder and the lifting mechanism which enables free motion of said mechanism when the piston is retracted, ensures that downward compensating movement of the attachment is not adversely influenced by the stiffness of the hydraulic cylinder.

IN THE DRAWINGS

A self-propelled forage harvester with an attachment in the form of a pick-up mechanism at its forward end and embodying the present invention, will now be described in greater detail, by way of example, with reference to the accompanying drawings, in which.

DESCRIPTION OF THE PREFERRED EMBODIMENT

Figure 1:
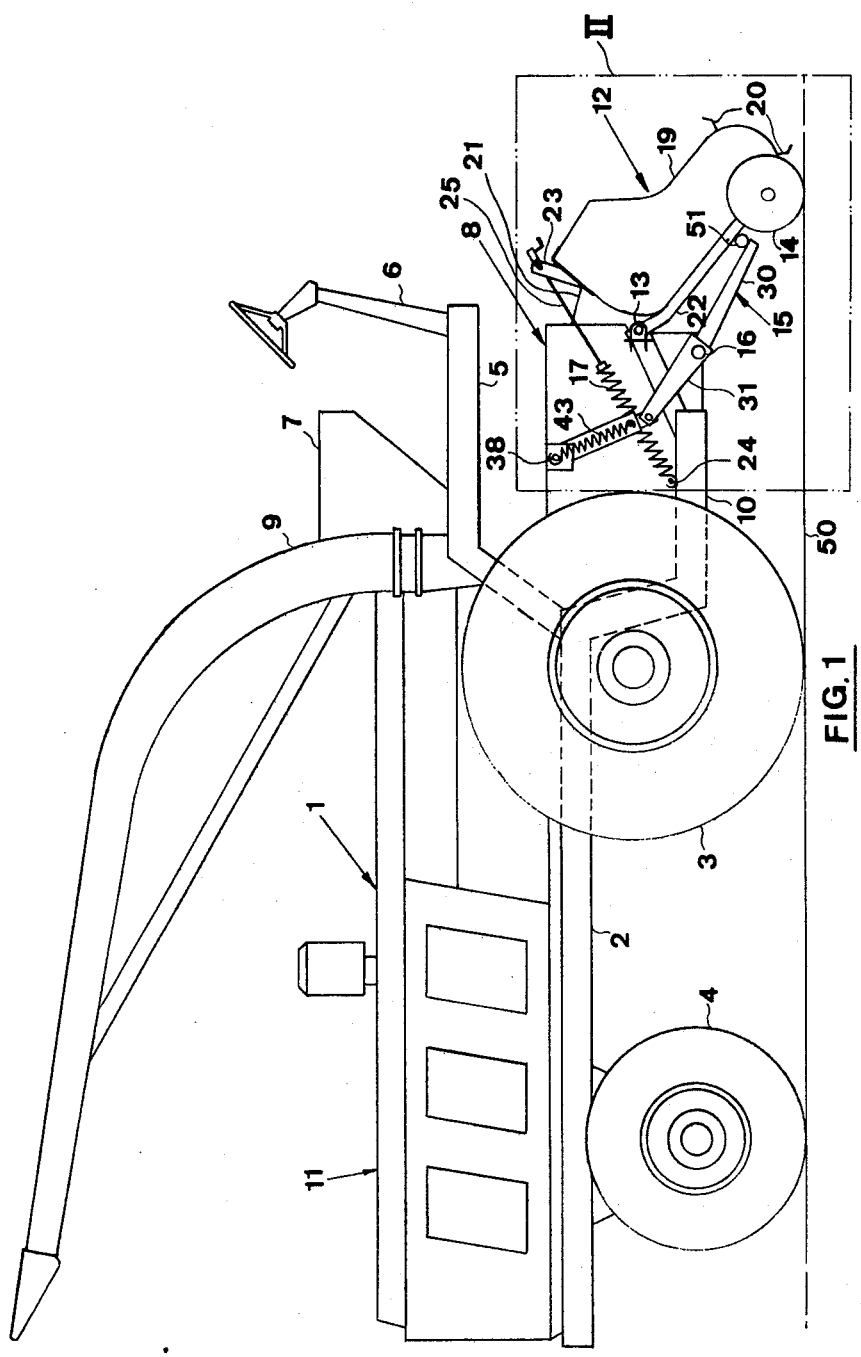
FIG. 1 is a schematic side view of a self-propelled forage harvester embodying the present invention.

With reference to FIG. 1, the forage harvester is of the self-propelled type and is indicated generally at 1 and comprises a chassis 2 which is supported on a pair of large front traction wheels 3 and a pair of smaller rear, steerable wheels 4. The chassis 2 further supports an engine which is located inside an engine compartment 11 and a front operator's platform 5 with a steering column 6, a dashboard 7 and an operator's seat (not shown).

A base structure in the form of harvesting unit, or so-called cutterhead, generally indicated at 8 is supported on forwardly-extending arms 10 of the chassis 2. Chopped forage crop is discharged from the base structure or the cutterhead 8 through the discharge spout 9 by means of a blower (not shown) into a wagon (also not shown) which is either trailed behind the forage harvester or alongside the same.

An attachment in the form of a pick-up mechanism, which is generally indicated at 12 and basically comprises a framework 19, forwardly-extending beams 22, groundengaging wheels 14 and a plurality of pick-up tines 20, is pivotally mounted at the forward end of the cutterhead 8 at 13. Transition means 21 are arranged between the pick-up 12 and the cutterhead 8 for conveying picked-up crop from the pick-up to the cutterhead. A tension spring 17 is secured at one end to a fixed point on the machine at the fixation means 24 disposed below the pivots 13 and coupled at its other end via a threaded rod 25 to fixation means 23 in the form of a bracket on the attachment 12. The rod 25 entends to the bracket 23 secured to the pick-up 12 and passes through an aperture in a stud 26 which is pivotally mounted in the upper end of the bracket 23. The other end of the rod 25 has a handle 28 secured thereto by a nut 27 to enable adjustment of the tension in the spring 17.

A lifting mechanism for the pick-up 12 is generally indicated at 15 and comprises a pivot shaft 16 pivotally supported on the cutterhead 8 at the lower and forward end thereof, a pair of forwardly-projecting arms 30, and a rearwardly-projecting arm 31. The forwardly-projecting arms 30 have rollers 51 at their forward ends which cooperate with the underside of the pick-up mechanism 12 and the beams 22.

Figure 4:
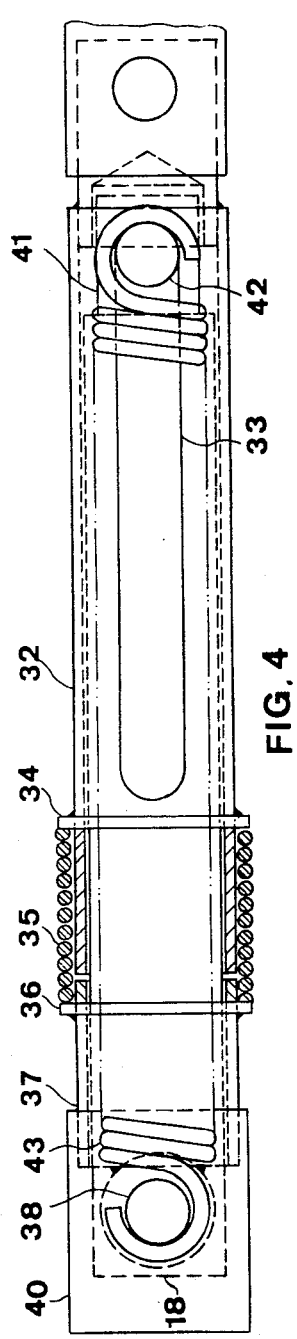
FIG. 4 is a partial view on a further enlarged scale of the components indicated at IV in FIG. 2.
Figure 5:
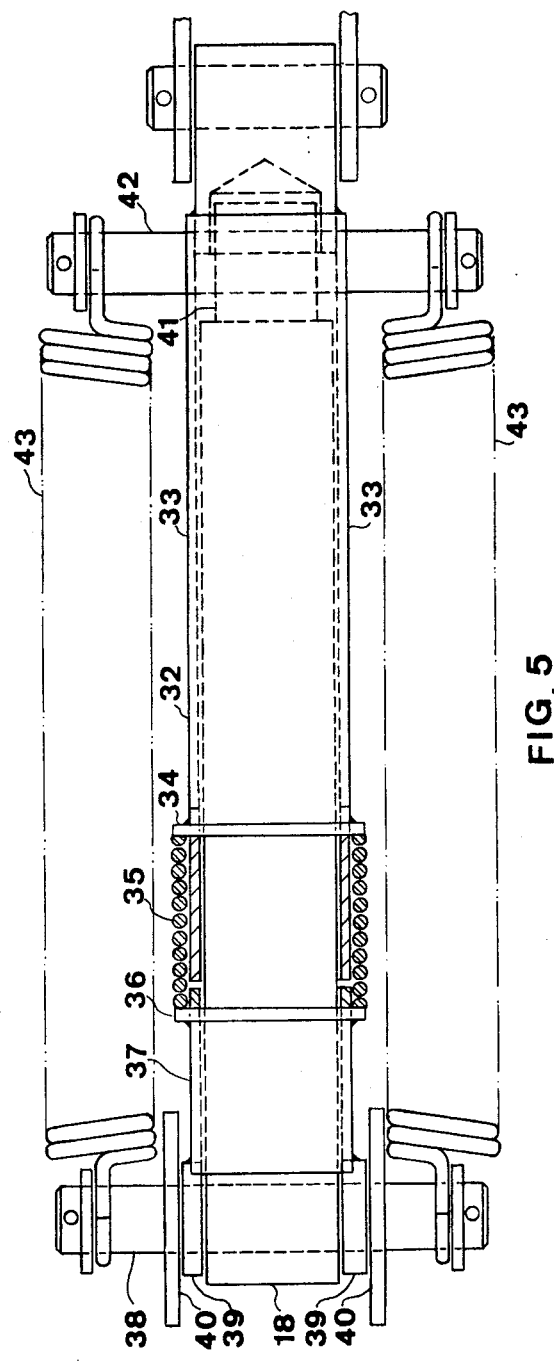
FIG. 5 is a top view of FIG. 4, and FIGS. 6 and 7 are diagrammatic views of the structure shown in FIG. 2 but in different positions.

The rearwardly extending arm 31 pivotally supports at its rearmost end a hollow cylindrical member 32 formed with a pair of opposite and elongated apertures 33 which extend axially of the member. At the upper end, the member 32 is provided with an abutment ring 34 against which one end of a compression spring 35 abuts. The compression spring 35 abuts at its other end against a similar abutment ring 36 provided on another hollow cylindrical member 37 which in turn is pivotally mounted on a pivot pin 38 by ears 39 (FIGS. 4–5). The pin 38 is held in two bearing plates 40 secured to the framework of the harvester. A hydraulic cylinder 18 is pivotally mounted at one end on the pivot pin 38 and extends through both members 37 and 32, which are axially aligned in downward direction. A piston 41 of the hydraulic cylinder 18, which is of the single-acting type, further supports at its lower end a pin 42 which extends through both of the apertures 33 in the member 32. Springs 43 are provided between the pins 38 and 42 and operate to urge the plunger 41 to a retracted position within the cylinder 18.

Figure 3:
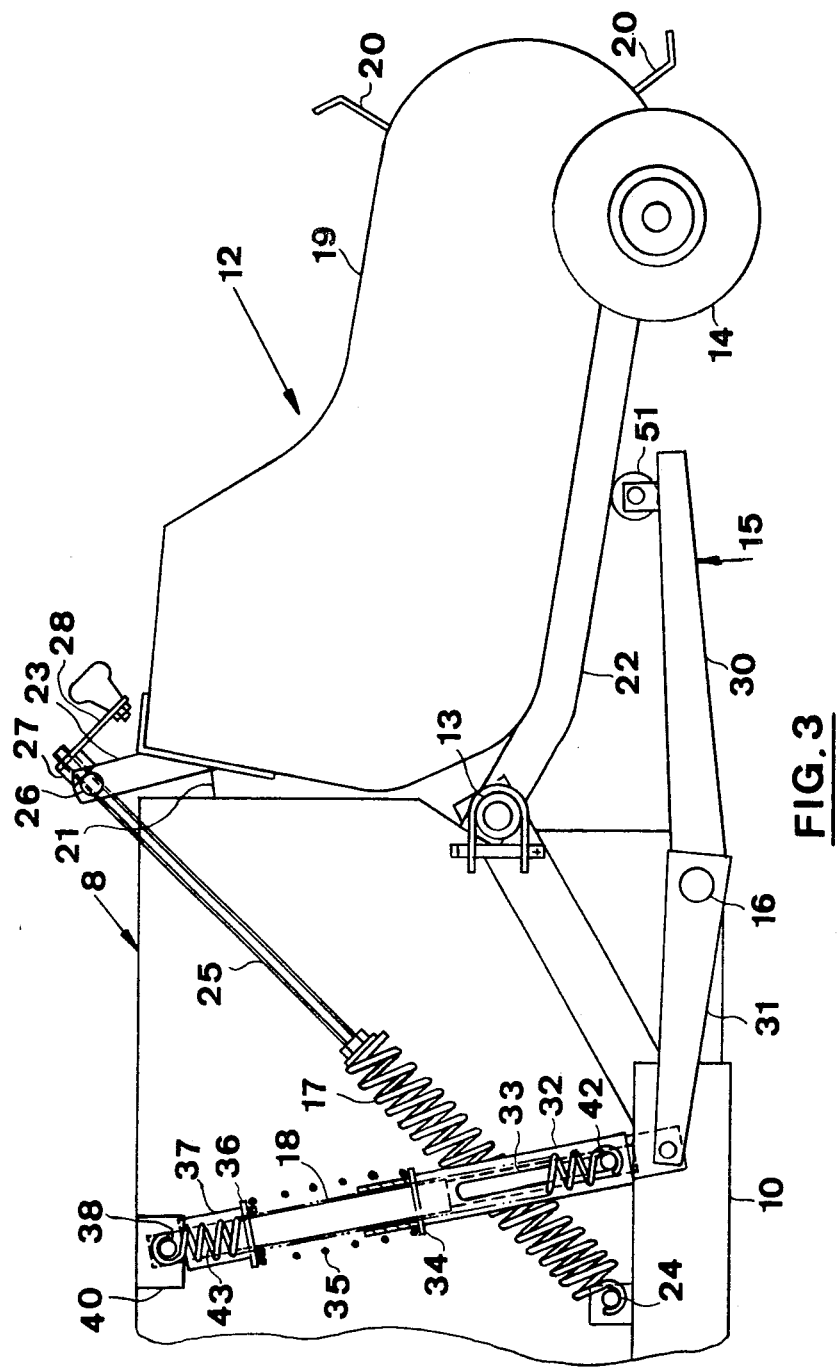
FIG. 3 is a view similar to FIG. 2 but showing the components in a different position.

With reference to FIG. 3, the pick-up mechanism 12 is shown in a transport position, i.e. in a fully raised position so that the wheels 14 do not engage the ground. In this position, the hydraulic cylinder 18 is actuated and the piston 41 is fully extended thereby causing the pin 42 to abut the lower ends of the elongated slots 33 in the bushing 32 and thus causing the lifting mechanism 15 to be held in a substantially horizontal position as shown in FIG. 3.

To move the pick-up mechanism 12 from the transport position to an operative position, the hydraulic fluid is drained from the hydraulic cylinder 18 and consequently the springs 43 cause the piston 41 fully to retract. As the pick-up mechanism 12 is no longer supported in its raised position, the weight thereof will cause the pick-up mechanism 12 and the lifting mechanism 15 to pivot in clockwise direction, as seen on FIG. 3. As a result of this pivotal movement the compensation spring 17 will be tensioned and the wheels 14 will touch the ground 50. Simultaneously, the member 32 will be shifted along the hydraulic cylinder 18 and the compression spring 35, which is relatively light, will be tensioned.

To operate properly, the tension of the compensation spring 17 should be adjusted by means of nut 27 and associated handle 28 in such a manner so that when on flat ground, the contact pressure of the pick-up wheels 14 on the ground surface is small, for example of the order of 40 kg.

OPERATION

When in operation should the pick-up means 12 encounter a bump in the ground surface, the pick-up wheels 14 will tend to ride over said bump rather than to dig into the ground, as a result of the aforementioned small ground contact pressure of the wheels 14. Thus the pick-up mechanism will be pivoted upwardly about the pivots 13 with a consequential contraction of the compensation spring 17. The forwardly-extending arms 30 of the lifting mechanism 15 will pivot upwardly to the same extent in order to follow the pick-up mechanism 12 in its pivotal motion under the action of the compression spring 35 which urges the member 32 in downward direction. The hydraulic cylinder 18 which at that moment is fully retracted, will not interfere with this movement of the bushing 32 as the elongated apertures 33 will enable downward movement of the member 32 relative to the pin 42. As the lifting mechanism 15 thus always follows the pick-up 12 when the latter is raised, the risks of the arms 30 digging into the ground, and more particularly into bumps, is positively avoided.

Figure 2:
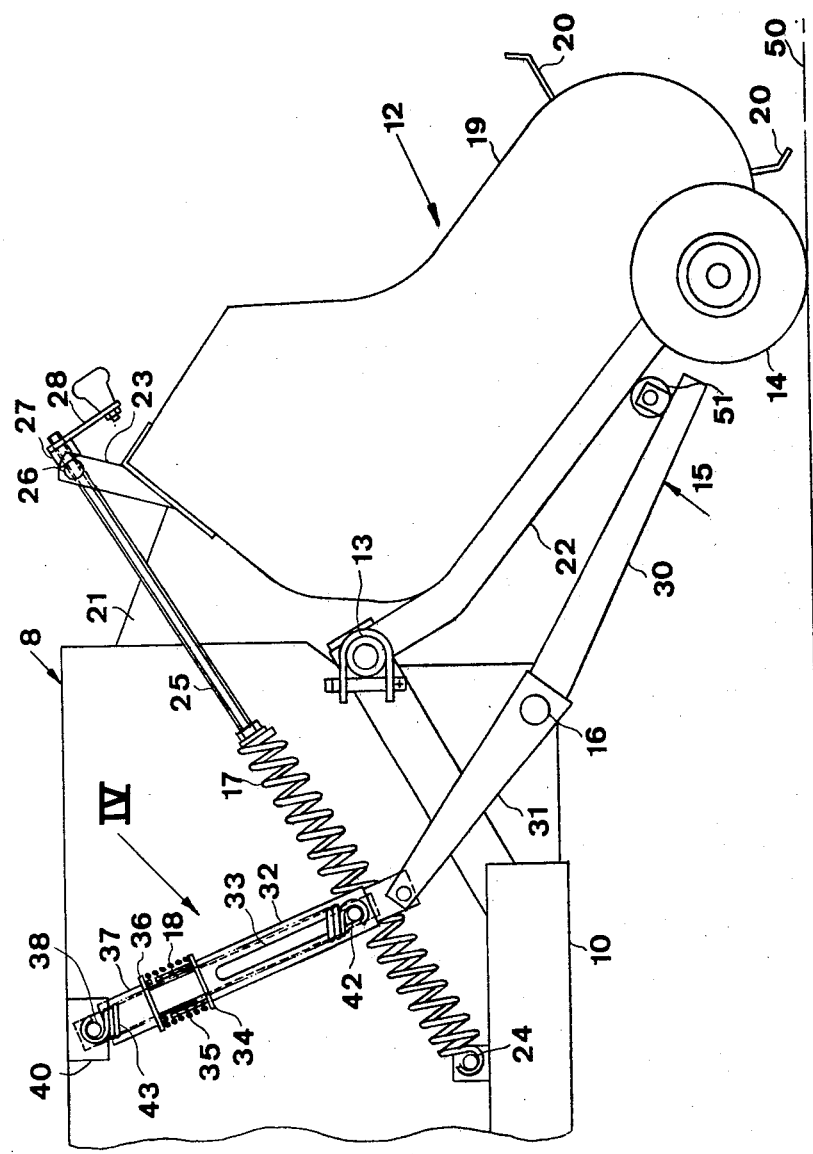
FIG. 2 is an enlarged detail view of the portion indicated at II in FIG. 1.

Now, assuming a dip in the ground surface 50 is encountered, the pick-up mechanism 12 will be pivoted in clockwise direction as seen in FIG. 3 so that the wheels 14 continue to contact the ground surface. The compensation spring 17 will be extended accordingly. Simultaneously, the pick-up 12 also causes the lifting mechanism 15 to pivot in the same direction, thereby causing the member 32 to be raised and the spring 35 to be compressed. The piston 41 of the cylinder 18 will not interfere with this movement as at this moment, the piston is fully retracted by the tension springs 43 and as the member 32 can move freely relative to the pin 42 due to the provision of the elongated slots 33 in the member 32. FIG. 2 shows the extreme lowermost position of the pick-up mechanism 12. In normal operational conditions, the pick-up 12 is positioned at a higher level so that the pin 42 is positioned somewhere inbetween the ends of the elongated apertures 33 in the member 32.

With reference to FIG. 1, it will be understood that when the traction wheels 3 encounter a bump or a dip, the required corrective pivotal movement of the pick-up mechanism 12 will be quite substantial as a result of the relatively large distance between the pick-up mechanism and the traction wheels. The required corrective movement of the pick-up mechanism 12 will be considerably larger when simultaneously the rear steerable wheels 4 encounter a dip or a bump. The required corrective pivotal movement on pull-type machines is much smaller as a result of the fact that in such machines the pick-up mechanism is provided close to the wheel axis of the single pair of supporting wheels.

To bring the pick-up mechanism 12 into its transport position, the hydraulic cylinder 18 is pressurized whereby, via pin 42, the piston 41 causes the member 32 to be lowered, the springs 43 to be tensioned and the arms 30 and 31 of the lifting mechanism 15 to be pivoted in anticlockwise direction as seen in FIG. 2. Via rollers 51, the arms 30 lift the pick-up mechanism 12 to its transport position.

Figure 7:
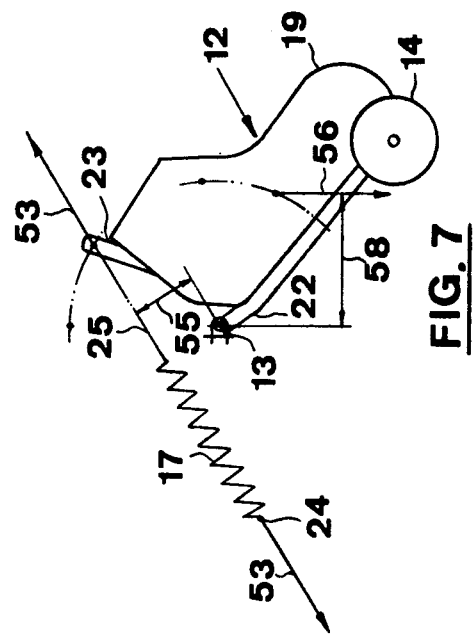
Figure 6:
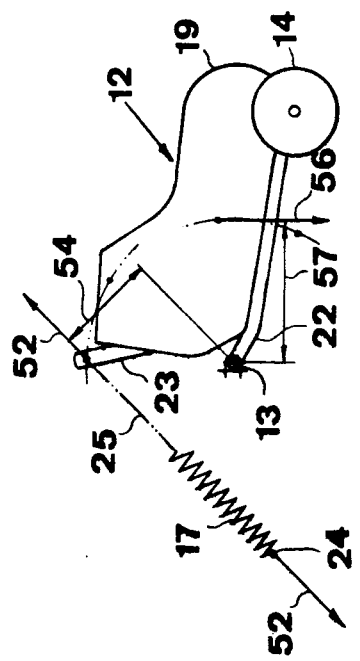

With reference to FIGS. 6 and 7, it will be understood that FIG. 6 shows the pick-up mechanism 12 at the moment of riding over a bump, while FIG. 7 shows the same pick-up mechanism 12 at the moment of riding in a dip. It will be understood that in both circumstances, the weight 56 of the pick-up mechanism will be the same. However, when riding in a dip, the distance 58 between the pivot axis 13 and the centre of gravity of the pick-up mechanism is smaller than the distance 57. Consequently, the torque created by the pick-up mechanism will be smaller when the pick-up is in a lower position.

On the other hand, the spring force of spring 17 represented at 52 will increase to 53 when the pick-up moves from a raised to a lower position. Simultaneously, the perpendicular distance between the spring 17 and the pivot axis 13 will be reduced from 54 to 55. As a result thereof, and dependent on the various ratios and the spring constant of spring 17, the compensation couple or torque around the pivot axis 13 will either remain substantially the same or be reduced, when the pick-up 12 moves to a lower position. This also means that in all positions of the pick-up mechanism 12 good compensation characteristics are obtained since the compensation torque and the weight torque do not differ substantially from each other. In other words, in all positions of the pick-up mechanism 12, the ground contact pressure of the pick-up mechanism remains substantially the same.

With the present invention, a good compensation mechanism for the pick-up means of a forage harvester is provided even when the forage harvester is of the self-propelled type. The compensating mechanism operates directly on the pick-up mechanism, whereby the number of components which have to move during operation of the compensation mechanism are reduced. Also the weight of these moving components has been kept as small as possible. Furthermore, an independent lifting mechanism for lifting the pick-up to a transport position has been provided. This independent lifting mechanism does not interfere with the operation of the compensation mechanism nor does it have a tendency to dig into the ground.

MODIFICATIONS

Finally, it will be realized that modifications and alterations to the described embodiments may be effected. For example, the pick-up wheels 14 may be replaced by well-known skids which would be disposed beneath the pick-up mechanism and which in operation would slide over the ground.

What we claim is:

1. An agricultural machine adapted to move in a field and process field crops, comprising:
   a base structure,
   an attachment extending from one end of the base structure for receiving crop material from the field and for conveying it to the base structure,
   pivot means on said one end of the base structure for pivotally mounting the attachment thereon, the attachment being movable between operative and transport positions,
   resilient means attached at one end to the attachment at a location above the pivot means and at the other end to the base structure for resiliently compensating the weight of the attachment and for floatingly maintaining the attachment in contact with the ground contour when in an operative position, and,
   independent lifting means pivotally mounted on the base structure at said one end and below the pivot means and reaching beneath the attachment for lifting the attachment from the operative position to a transport position.

2. An agricultural machine as recited in claim 1, wherein the resilient weight compensation means comprises:
   a fixation means on the base structure at one side of the pivot means,
   a fixation means on the attachment above and at the other side of the pivot means and above the fixation means on the base structure, and
   spring means extending upwardly from the fixation means on the base structure to the fixation means on the attachment.

3. An agricultural machine as recited in claim 2, wherein the compensation means further comprises:
   a threaded rod attached at one end to the spring means and extending to the associated fixation means and,
   a handle on the other end of the threaded rod adjacent said fixation means for adjusting the spring tension.

4. An agricultural machine as recited in claim 1, wherein the independent lifting means comprises:
   a pivot shaft pivotally mounted in transverse direction on said one end of the base structure,
   at least one arm attached at one end to the pivot shaft and extending underneath the attachment,
   a roller mounted at the other end of said one arm for contacting the underside of the attachment,
   a further arm attached at one end to the pivot shaft and extending generally opposite to said one arm,
   actuable power motor means mounted at one end on the base structure and connected at the opposite end to said further arm, for, upon actuation of the motor means, pivoting the further arm, the pivot shaft, the one arm and for lifting the attachment from an operative to a transport position.

5. An agricultural machine as recited in claim 4, wherein the actuable power motor means comprises a hydraulic cylinder of the single-acting type with a piston and spring means associated with the hydraulic cylinder for urging the piston to the retracted position.

6. An agricultural machine as recited in claim 1 further comprising spring means between the base structure and the independent lifting means for urging the lifting means to follow any upward movement of the attachment during operation of the weight compensation means.

7. An agricultural machine as recited in claim 5 further comprising:
   two axially aligned hollow cylindrical members mounted around the hydraulic cylinder, one member pivotally attached with the hydraulic cylinder to the base structure and the other member attached to said further arm and having at least one elongated aperture,
   a pin attached to the piston of the hydraulic cylinder and extending through the elongated aperture,
   said spring means associated with the hydraulic cylinder extending between the base structure and the pin for urging the piston of the hydraulic cylinder to the retracted position and
   further spring means extending between the hollow cylindrical members for urging said independent lifting means to follow any upward movement of the attachment during operation of the weight compensation means.

8. An agricultural machine as recited in claim 7 wherein said other hollow cylindrical member comprises two diametrically opposed elongated apertures and wherein the pin extends therethrough; the spring means associated with the hydraulic cylinder comprising a pair of tension springs acting between the base structure and the pin and wherein said further spring means comprise a compression spring urging the axially aligned cylindrical members away from each other.

9. In an agricultural machine which is adapted to move in a field and to process field crops and having a base structure, an attachment pivotally mounted by pivot means on the base structure at one end thereof and extending from that end and resilient weight compensation means attached at one end to the attachment and at the other end to the base structure for floatingly maintaining the attachment in contact with the ground contour when in an operative position, the improvement comprising:
   independent lifting means pivotally mounted on the base structure at said one end thereof below the pivotal mounting of the attachment thereof and reaching beneath the attachment, and actuable power motor means mounted at one end on the base structure and coupled at the other end to the lifting means for selectively lifting the attachment from an operative position to a transport position.

10. An agricultural machine as recited in claim 9 further comprising:
    spring means between the base structure and the independent lifting means for urging the lifting means to follow any upward movement of the attachment during operation of the weight compensation means, and one direction coupling means between the actuable power motor means and the lifting means for transmitting lifting power to the lifting means upon actuation of the motor means and for enabling said spring means to urge the lifting means to follow any upward movement of the attachment during operation of the weight compensation means without the actuable power motor means interfering therewith.

11. An agricultural machine as recited in claim 10 wherein the lifting means comprises:

at least one arm extending beneath the attachment, a further arm extending generally opposite to said one arm, and wherein the power motor means is a hydraulic cylinder with a piston and mounted at one end on the base structure and coupled at the other end to said further arm.

12. An agricultural machine as recited in claim 11 wherein the hydraulic cylinder is of the single-acting type and wherein the agricultural machine further comprises spring means extending between the base structure and the piston for urging the piston to the retracted position.

13. In an agricultural machine which is adapted to move in a field and to process field crops and having a base structure, an attachment pivotally mounted by pivot means on the base structure at one end thereof and extending from that end, and resilient weight compensation means attached at one end to the attachment and at the other end to the base structure for floatingly maintaining the attachment in contact with the ground contours when in an operative position, the improvement comprising:

at least one lifting arm pivotally mounted on the base structure at said one end and extending from that end and beneath the attachment, a further arm attached to said one arm and extending generally opposite thereto, a hydraulic cylinder of the single-acting type with a piston and mounted at one end to the base structure, first spring means extending the base structure and the piston for urging the piston to the retracted position when not actuated, one direction coupling means mounted between the cylinder and said further arm for upon actuation of the hydraulic cylinder pivoting said further arm and said one arm, for lifting the attachment from an operative position to a raised position, and for enabling free movement of said further arm away from the cylinder when the hydraulic cylinder is not actuated, and second spring means between the base structure and said further arm for urging said one arm to follow any upward movement of the attachment during operation of the weight compensation means and when the hydraulic cylinder is not actuated.

14. An agricultural machine as recited in claim 13 further comprising a pin attached to the piston of the hydraulic cylinder and wherein the one direction coupling means comprises a hollow cylindrical member coupled to said further arm and extending around the piston and having at least one elongated aperture for said pin to extend therethrough and wherein said first and second spring means extend between the base structure on the one hand and said pin, respectively said cylindrical member on the other hand.

* * * * *